INVENTORS
WILLIAM C. DEAN
BY MAURICE E. TAYLOR

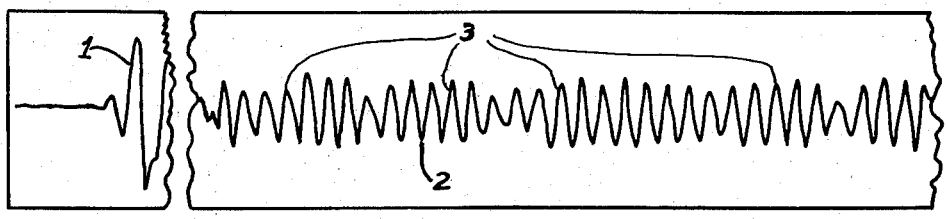
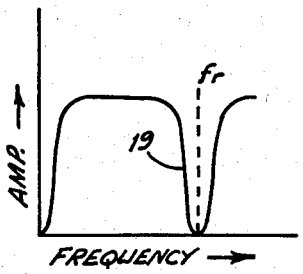
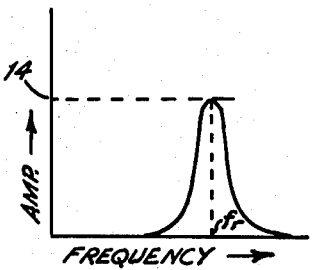
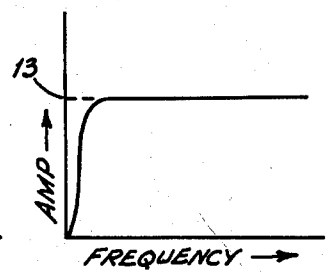
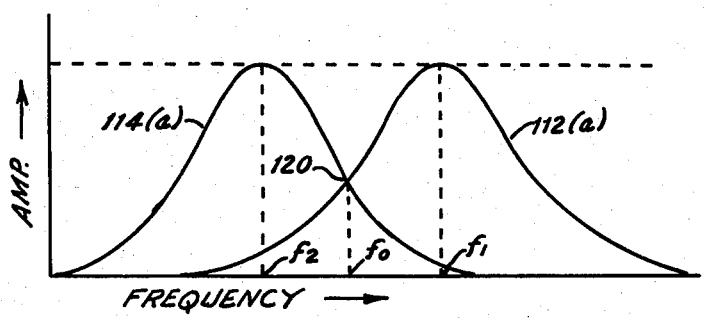
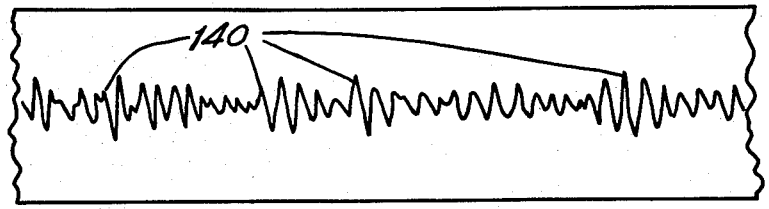

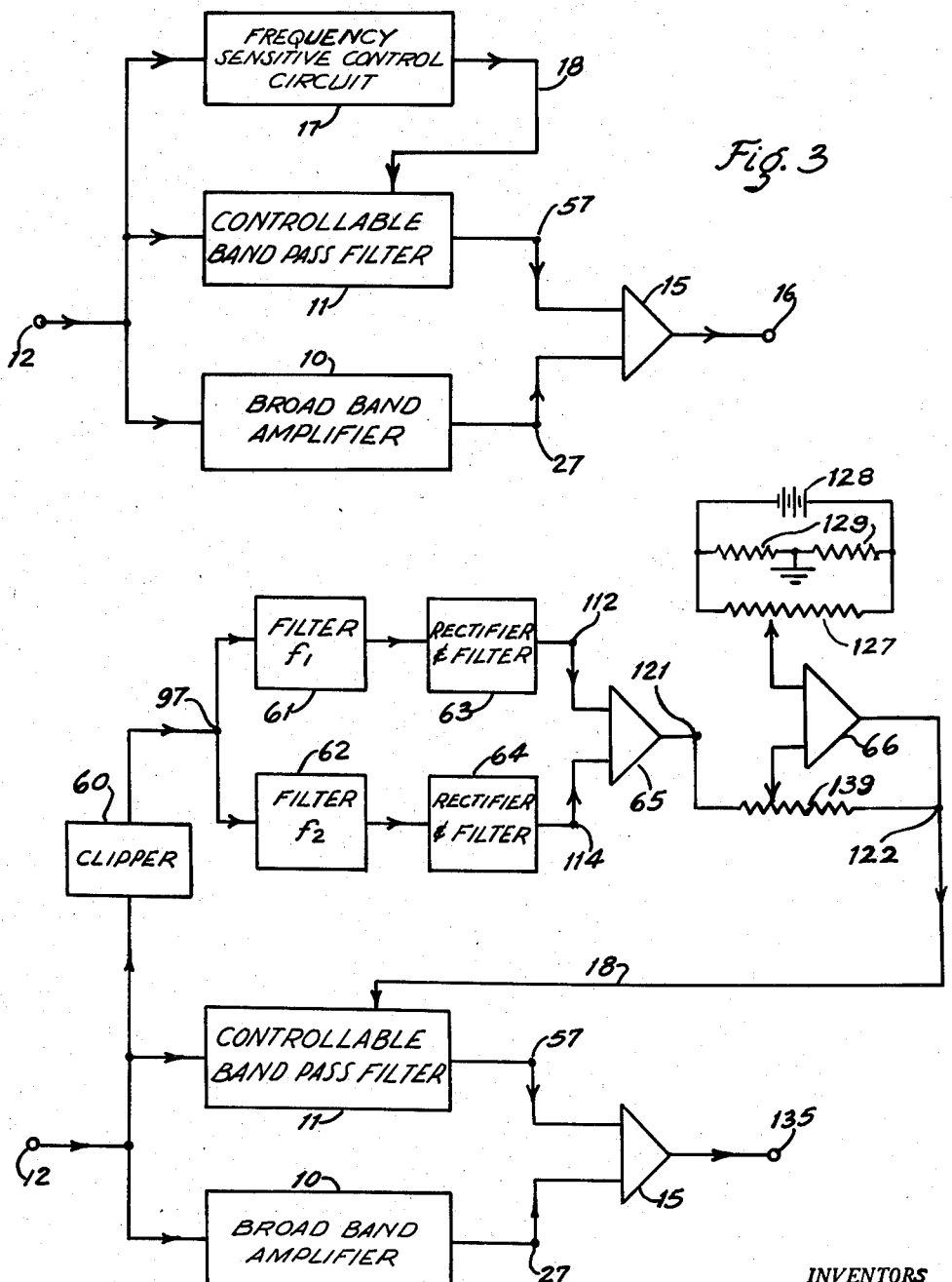

ATTORNEY

Dec. 13, 1960  W. C. DEAN ET AL  2,964,712
AUTOMATICALLY TUNED NOTCH FILTER
Filed Sept. 29, 1959  5 Sheets-Sheet 4

INVENTORS
WILLIAM C. DEAN
BY MAURICE E. TAYLOR

ATTORNEY

Dec. 13, 1960 W. C. DEAN ET AL 2,964,712
AUTOMATICALLY TUNED NOTCH FILTER
Filed Sept. 29, 1959 5 Sheets-Sheet 5

INVENTORS
WILLIAM C. DEAN
MAURICE E. TAYLOR
BY

ATTORNEY

United States Patent Office 2,964,712
Patented Dec. 13, 1960

2,964,712

AUTOMATICALLY TUNED NOTCH FILTER

William C. Dean, Indiana Township, Allegheny County, and Maurice E. Taylor, Monroeville, Pa., assignors to Gulf Research & Development Company, Pittsburgh, Pa., a corporation of Delaware Filed Sept. 29, 1959, Ser. No. 843,232

9 Claims. (Cl. 330—124)

This invention relates to electrical filter networks and in its more specific aspects relates to apparatus for filtering a relatively sustained undesired sinusoidal signal from a composite electrical signal that contains useful impulses. In particular the invention relates to an electrical filter network having particular utility in eliminating ringing from geophysical seismograms obtained in certain seismic prospecting operations.

In many electrical applications the problem arises of removing a more or less sustained substantially sinusoidal disturbing signal from a composite signal that also contains useful signals in the form of impulses. For example, this problem arises in geophysical seismic prospecting operations in certain water-covered areas and the invention will be described as applied to this problem.

In conventional seismic prospecting apparatus it is customary to fire an explosive in the ground and to observe the resulting seismic impulses at a number of spaced points by means of geophones. Seismic prospecting operations are often times carried out over water-covered areas and special techniques have been developed for firing the shot in the water and observing the seismic impulses by means of special hydrophones, the entire operation generally being performed from boats. In certain parts of the world the water bottom is of such a nature that a strong reflection with little or no attenuation occurs at or near the water bottom. The upper surface of the water is also a good reflecting surface. The shot is ordinarily detonated in the water because this provides good energy transfer from the explosion to the seismic medium. In such areas where the water bottom is a good reflector, a major portion of the shot repeatedly reflects back and forth between the bottom of the water and the top of the water with little or no attenuation. A seismogram taken in such areas will show multiple reflections occurring in the water at more or less regular intervals on the seismogram, and the seismic reflections from depth which it is desired to analyze are superimposed on the multiple water reflections. The seismogram in such areas has the appearance of more or less continuous oscillation with minor fluctuations superimposed thereon. In the seismic prospecting art the phenomenon of multiple water reflection is commonly called "ringing" or "singing." It is commonly experienced in Lake Maracaibo, Venezuela, and also in certain parts of the Gulf of Mexico. A similar phenomenon may also occur on land but is less frequently observed and occurs in more restricted areas.

Due to the high amplitude of the ringing signals, it is very difficult to extract the useful seismic information from a seismogram taken in areas where ringing is encountered. Often times the ringing frequency, which is dependent on the water depth as well as other factors, may be very close to the frequency of the useful seismic reflections which are to be analyzed. Accordingly it is not possible to employ simple transmission filters to separate the ringing from the useful seismic impulses because to do so would require a filter of such a narrow pass band as to itself introduce undesirable oscillation into the filtered seismogram. Other devices such as the use of multiple geophones requiring special set-ups in the field are undesirable because they are very expensive and materially slow up the field operations.

It is an object of this invention to provide an electrical filter which has a high discrimination against ringing frequencies observed on seismograms but which introduces substantially no oscillation into the record. It is a further object of this invention to provide an electrical filter network which automatically adjusts itself to suppress the particular ringing frequency present. These and other objects of this invention are attained in the manner herein described with reference to the accompanying drawings forming a part of this specification and in which—

Figure 1 shows an example of the type of "ringing" seismogram to which this invention is directed;

Figures 2(a), 2(b), and 2(c) are frequency characteristic curves pertaining to certain parts of this invention;

Figure 3 is a block diagram of one embodiment of this invention;

Figure 4 is a block diagram of a preferred embodiment of this invention;

Figure 7 shows frequency characteristic curves pertaining to the amplifiers of Figure 6;

Figure 9 shows an example of the result when this invention is employed to filter a "ringing" seismogram of the type shown in Figure 1.

Figure 5:
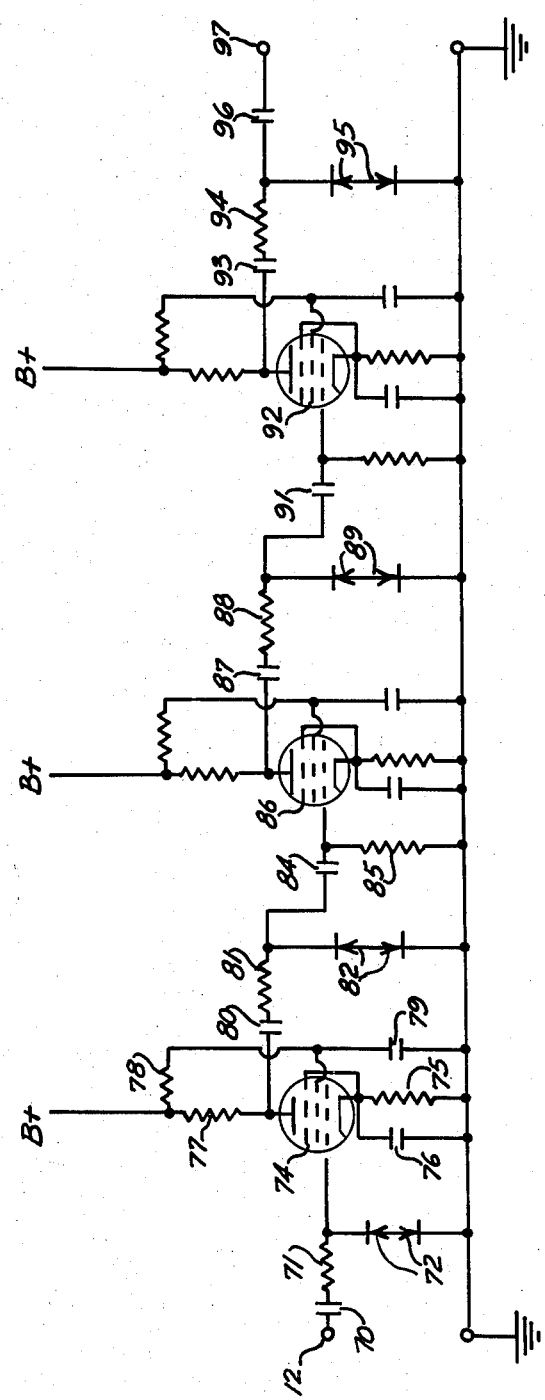
Figure 5 is a schematic wiring diagram of a signal clipper employed in this invention.

The invention comprises a notch filter having a narrow absorption and whose frequency is automatically controlled. This is accomplished by connecting a broad-band amplifier in parallel with a band-pass filter whose pass-band frequency is controllable, and combining both outputs in a differential amplifier from which the filtered signal is obtained. The band-pass filter is of a type whose pass-band frequency can be controlled by means of an electrical signal. A frequency-sensitive control circuit is also connected in parallel with the broad-band amplifier and the band-pass filter, and the output of the frequency-sensitive control circuit is employed to control the pass band of the band-pass filter. By this means the notch in the over-all filter characteristic is held at the ringing frequency. On the other hand the transient transmission characteristic of the system is such that substantially no oscillation or "tailing" is introduced into seismic impulses which are transmitted through the system.

Referring to Figure 1 there is shown portions of a typical seismogram taken in Lake Maracaibo which shows excessive ringing. The timing lines conventional on seismograms have been omitted from Figure 1 in the interest of clarity. Figure 1 shows but one trace of the seismogram and is typical of the records made in large areas of Lake Maracaibo. It is apparent that subsequent to first arrival 1, the record shows a high degree of oscillation 2 which continues at substantially constant amplitude, i.e. with little attenuation, throughout the record. Superimposed on the oscillations 2 are smaller signals evidenced by variations in amplitude as shown at 3, and these smaller signals represent the useful seismic reflection impulses of interest. It is apparent, however, that in the presence of the large amplitude ringing signal, it is extremely difficult to accurately time the arrival of signals such as 3, and in its unmodified form the record of Figure 1 is substantially unuseable.

Referring to Figure 3, the invention comprises a parallel arrangement of a broad-band amplifier 10 connected in parallel with a band-pass filter 11, the input signal being applied at terminal 12. Figure 2(c) shows a steady-state frequency characteristic of the broad-band amplifier 10 which has substantially constant amplification over a frequency range that encompasses substantially all of the frequencies observed on the record of Figure 1. The amplifier 10 has a substantially constant amplification given by ordinate 13 as shown in Figure 2(c). The band-pass filter 11 is of a type that has a steady-state frequency characteristic illustrated in Figure 2(b). The filter 11 has a transmission band whose peak frequency $f_r$ has a peak amplification given by the ordinate 14. The amplifier 10 and band-pass filter 11 are respectively adjusted by means of conventional volume controls so that the maximum transmission amplitude 14 of the band-pass filter 11 is the same as the transmission amplitude 13 of the broad-band amplifier 10. The outputs of channels 10 and 11 are connected to the input terminals of a unity gain differential amplifier 15 (Figure 3). The differential amplifier 15 performs the operation of subtracting the signal transmitted by band-pass filter 11 from the signal transmitted by the broad band amplifier 10. The steady-state output characteristic of the network comprising elements 10, 11, and 15 is shown in Figure 2(a). The characteristic 2(a) shows a substantially flat response with a notch 19 at the frequency $f_r$ corresponding to the frequency adjustment of the pass band of filter 11. Accordingly if a seismic signal of the form shown in Figure 1 is introduced at terminal 12 of Figure 3, the output from the differential amplifier 15 delivered at terminal 16 will show substantially less signal component having the frequency $f_r$. It is apparent that by adjusting the frequency $f_r$ to coincide with the ringing frequency on the seismogram of Figure 1, the ringing signal may be materially reduced with respect to the seismic signal by transmission of the seismogram signal through the elements 10, 11, and 15 connected as shown in Figure 3. It is further known that a system of the type comprising elements 10, 11, and 15 will introduce no appreciable lengthening of an impulse when transmitted through the system. Accordingly the network comprising elements 10, 11, and 15 is particularly advantageous for filtering seismic records of the type shown in Figure 1.

It is found that the ringing frequency usually changes slightly from record to record and may even change slightly during the course of any particular record. Accordingly in order to make the network comprising elements 10, 11, and 15 effective against ringing, it is necessary that the band-pass filter 11 always be accurately tuned to the ringing frequency. In order to achieve this, the signal from input terminal 12 is also fed to a frequency-sensitive control circuit 17 (Figure 3). The frequency-sensitive control circuit 17 is of a type which produces a unidirectional output which is related to the predominating frequency of the input signal. The unidirectional output of the circuit 17 is delivered on lead 18 and is employed to control the frequency adjustment of the band-pass filter 11. As previously stated, the band-pass filter 11 is of a type such that the frequency of its pass band can be controlled by an electrical signal and the manner in which this is accomplished will be described in detail later. It is apparent that by means of the frequency-sensitive control circuit 17 and control connection 18, the band-pass filter 11 is always adjusted so that its transmission peak occurs exactly at the ringing frequency. The time constant of the control system is made short enough to follow slow changes in the ringing frequency but long enough to be insensitive to transient electrical signals, thereby effectively maintaining the notch 19 in the overall characteristic curve of the system (Figure 2(a)) at the correct frequency $f_r$ to effect maximum attenuation of the ringing signals with respect to the useful seismic signals.

The differential amplifier 15 is a conventional high-gain amplifier having two input circuits whose instantaneous signal difference is delivered to output terminal 16. A conventional so-called operational amplifier may be employed, as for example Philbrick model K2–W Operational Amplifier made by George A. Philbrick Researches, Inc. of Boston, Massachusetts. The amplifier 15 is preferably connected as a unity gain differential amplifier in normal manner, for example as recommended by the manufacturer. Inasmuch as this device is conventional and well known, it will not be described in detail. Specific embodiments of the elements 10, 11, and 17 of Figure 3 will now be described.

Figure 8:
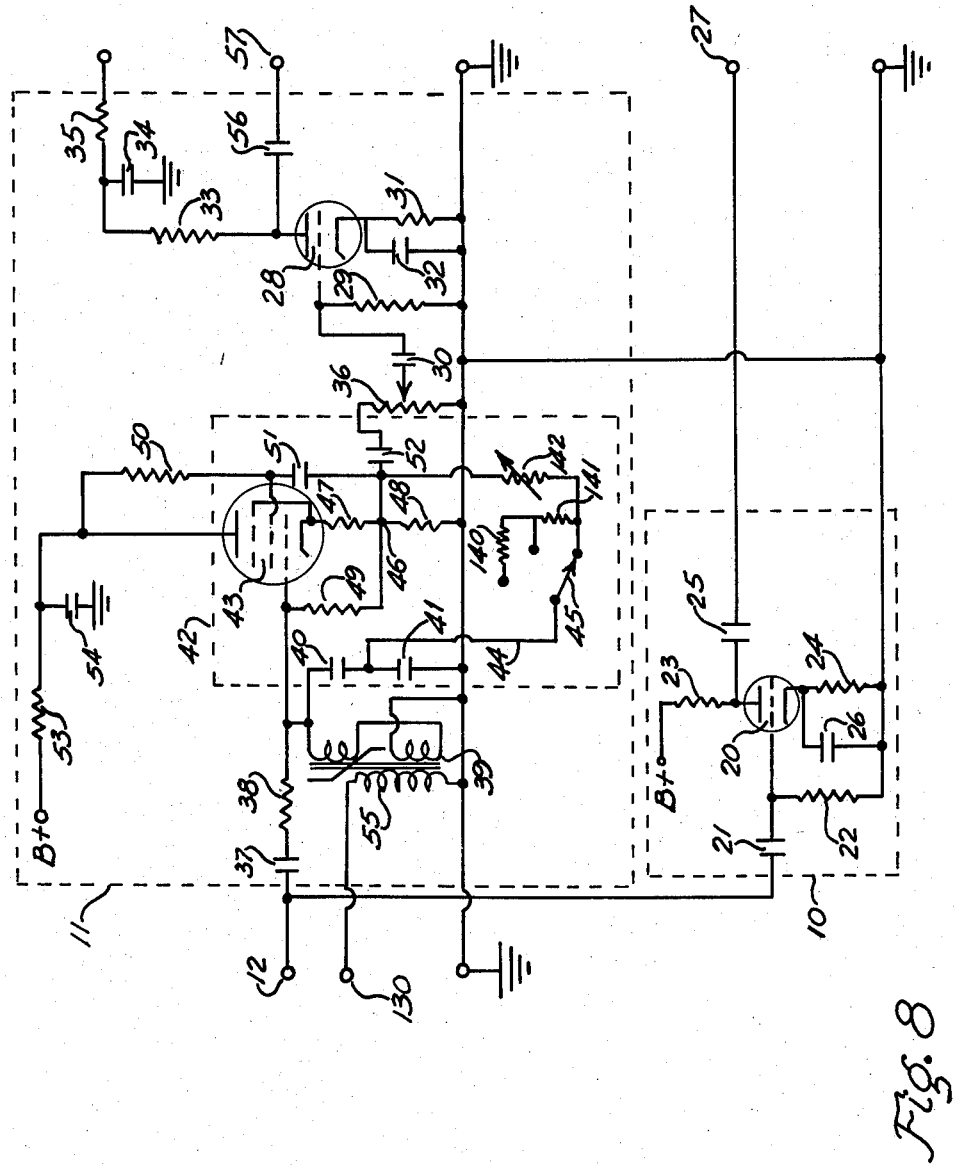
Figure 8 is a schematic wiring diagram of a band-pass filter and broad band amplifier employed in this invention.

Referring now to Figure 8 there is shown a schematic wiring diagram of elements 10 and 11 of Figure 3. The input signal is applied to terminal 12. The signal is transmitted through a conventional broad-band amplifier which comprises the elements inside the dotted outline 10. The signal is also transmitted through a band-pass filter which comprises the elements inside the dotted outline 11. The dotted outlines 10 and 11 of Figure 8 correspond to the elements 10 and 11 of Figure 3. The broad-band amplifier 10 comprises vacuum tube 20 together with its input and output circuits. The input circuit of tube 20 comprises coupling condenser 21 and grid resistor 22 connected in conventional manner. The tube has plate resistor 23 and cathode resistor 24, the latter being shunted by bypass condenser 26. Output is obtained from the plate of tube 20 through coupling condenser 25. The output of broad-band amplifier 10 is delivered to terminal 27.

By way of example in Figure 8 the band-pass filter 11 is shown as a high-Q resonant filter, but other types of band-pass filter circuits may alternatively be employed as element 11. Use of a high-Q resonant filter such as shown in Figure 8 results in the system having a narrow notch 19 (Figure 2(a)). If a broader notch is desired, the band-pass filter must include a phase-correcting network that provides a zero phase shift (i.e. substantially flat phase response) throughout the range of operating frequencies. In Figure 8 the high-Q resonant filter comprises tube 28 having conventional grid resistor 29, coupling condenser 30, cathode resistor 31, bypass condenser 32, plate resistor 33, and a plate supply decoupling network comprising condenser 34 and resistor 35, all connected as shown in Figure 8. Input to the tube 28 is obtained through potentiometer 36 in order that the gain of filter 11 may be adjusted. At the input of filter 11 the signal traverses the blocking condenser 37 and series resistor 38. The resonant tank circuit comprises inductor 39 and condensers 40 and 41 connected as shown. In order to increase the Q-value of the resonant tank circuit, there is connected to it a conventional Q-multiplier network made up of the elements inside the dotted outline 42. The Q-multiplier comprises pentode tube 43 connected as indicated. A lead 44 is connected to the junction of condensers 40 and 41 and to a selector switch 45 which together with variable resistor 142 and fixed resistors 140 and 141 permits the resistance in the circuit returning to the cathode connection 46 to be adjusted in order to adjust the Q-value of the circuit. Cathode resistors 47 and 48 complete the cathode circuit of tube 43 and resistor 49 serves as grid resistor. The proper screen voltage is obtained through resistor 50 which has bypass condenser 51. The effect of the network 42 is to increase the Q-value of the resonating circuit comprising inductance 39 and condensers 40 and 41. The particular value of Q obtained will depend on the position of switch 45 and it is made adjustable in order that the width of the notch 19 of Figure 2(a) may be varied, although the width of notch 19 will generally be less than the width of the pass band of the high-Q resonant filter. Output of the Q-multiplier is obtained through condenser 52 and is fed to gain control 36 previously mentioned. The plate of tube 43 is supplied from the de-coupling network consisting of resistor 53 and condenser 54.

In the high-Q resonant circuit 11 shown in Figure 8 the inductance 39 is a saturable-core reactor having a conventional control winding 55 that is connected to terminal 130. By passing direct current through the control coil 55, the inductance of the reactor 39 may be lowered whereby the resonant circuit will tune at a higher frequency. In this manner the peak $f_r$ of the transmission frequency of the high-Q resonant circuit may be varied, and correspondingly the frequency of the notch 19 (Figure 2(a)) in the resulting frequency characteristic of the system may be varied as desired. The inductance 39 and the condensers 40 and 41 are chosen so that the resonant frequency of the tank circuit can be controlled over the frequency range of interest, i.e. from the lowest ringing frequency expected to the highest ringing frequency expected to be encountered on the seismogram. Output from the high-Q resonant filter network 11 is obtained through coupling condenser 56 and delivered to terminal 57. The above-described network contained inside the dotted outline 11 (Figure 8) thus provides a band-pass filter the peak of whose pass band is adjusted to a frequency $f_r$ which is determined by the D.-C. applied to terminal 130.

The outputs of the broad band amplifier 10 and the band-pass filter 11 delivered at terminals 27 and 57 respectively are fed to the previously-mentioned differential amplifier 15. The resulting output of the network comprising elements 10, 11, and 15 will have a steady-state characteristic illustrated in Figure 2(a). The volume control 36 is appropriately adjusted so that the bottom of the notch 19 shall fall substantially on the zero ordinate of Figure 2(a). This adjustment may easily be made by applying a steady state test signal to terminal 12, adjusting the frequency of the applied signal to the minimum point of the notch 19, and then adjusting the volume control 36 to bring the minimum point to zero signal output on terminal 16.

The frequency-sensitive control circuit 17 of Figure 3 must necessarily have a time constant which is relatively short in order that the control signal developed on lead 18 shall take effect early in the course of the seismogram. As may be seen in Figure 1 there is no signal input to the system until the first arrivals 1 appear so that the frequency-sensitive control circuit 17 will develop no signal on lead 18 until after the first arrivals 1 appear. An effective and preferred form of frequency-sensitive control circuit is shown in block diagram in Figure 4. Figure 4 shows the elements 10, 11, and 15 connected to input terminal 12 as previously described, the frequency control signal being obtained over lead 18. Also connected to terminal 12 is a clipper circuit 60 whose output is applied in parallel to two tuned filters 61 and 62. One of these filters, for example 62, is tuned to a frequency $f_2$ that is below the lowest ringing frequency to be expected. The other filter 61 is tuned to a frequency $f_1$ that is above the highest ringing frequency to be expected. Two full-wave rectifiers and low pass filter circuits 63 and 64 are respectively connected to the output of filters 61 and 62. The outputs of elements 63 and 64 will be unidirectional and these are fed to the input of a differential amplifier 65. Differential amplifier 65 is identical in all respects to element 15 previously described and may be a conventional unity-gain operational amplifier of the same type as 15. The output of amplifier 65 is fed to an operational amplifier 66 that combines the output of amplifier 65 with a D.-C. potential and (as will be explained in more detail later) serves to permit the operator to set the initial (zero control signal) value of the inductor 39 (Figure 8) that is part of circuit 11. By means of the control network comprising elements 60 to 66 the band-pass filter 11 is continuously maintained in an adjustment such that the notch 19 of the curve in Figure 2(a) corresponds to the average ringing frequency $f_r$. The initial (zero control signal) value of inductor 39 is set so that even in the absence of any input signal on terminal 12 the band-pass filter 11 is roughly in correct frequency adjustment, i.e. at approximately halfway between the highest ringing frequency and the lowest ringing frequency expected to be encountered on the seismogram. The frequency-sensitive control system comprising elements 60 to 66 needs only to make slight modifications in frequency adjustment in a manner to be explained later. Accordingly the system of Figure 4 responds quickly and accurately to any changes in ringing frequency that may occur during the course of the seismogram or from one seismogram to another.

In order that the frequency-sensitive control network comprising elements 60 to 66 (Figure 4) be actuated only by the ringing frequency and be substantially independent of minor frequency fluctuations which the useful seismic signals (such as 3 of Figure 1) superimpose thereon, the clipper circuit 60 of Figure 4 is as shown in detail in Figure 5. Input signal from terminal 12 passes through condenser 70 and resistor 71 and is clipped by means of a pair of Zener diodes 72, connected back to back as shown. The Zener diodes 72 are of well-known type and each diode 72 has substantially zero resistance in the forward direction and infinite resistance in the reverse direction up to a certain voltage beyond which it passes current but maintains a substantially constant potential drop across its terminals. The clipped signal is fed to the grid of tube 74. Tube 74 has a conventional cathode resistor 75, bypass condenser 76, as well as plate resistor 77. Screen supply is obtained through screen resistor 78 having bypass condenser 79. Output signal from the plate of tube 74 passes through coupling condenser 80 and resistor 81 and is clipped by a second pair of Zener diodes 82. The clipped signal is transmitted by the coupling network comprising condenser 84 and grid resistor 85 to the grid of tube 86 whose cathode, plate, and screen circuits are similar in all respects to those of tube 74 already described. The output of tube 86 passes through condenser 87 and resistor 88 and is clipped by a third pair of Zener diodes 89. The clipped signal is transmitted through coupling condenser 91 and applied to the grid of tube 92. Tube 92 is similar to tubes 74 and 86 and its output signal, transmitted through condenser 93 and resistor 94, is clipped by a fourth pair of Zener diodes 95. A blocking condenser 96 transmits the output signal to terminal 97. It is seen that the circuit of Figure 5 repeatedly clips and amplifies the signal. This results in delivering at terminal 97 a signal whose frequency is responsive only to the zero crossings of the seismogram illustrated in Figure 1, and it is apparent that the frequency of these zero crossings is determined by the ringing frequency. Therefore, the signal delivered at terminal 97 is essentially the ringing frequency and is practically uninfluenced by minor signals that may be superimposed thereon. In this manner a reliable sampling of the ringing frequency is made by the circuit of Figure 5, which is element 60 of Figure 4.

Figure 6:
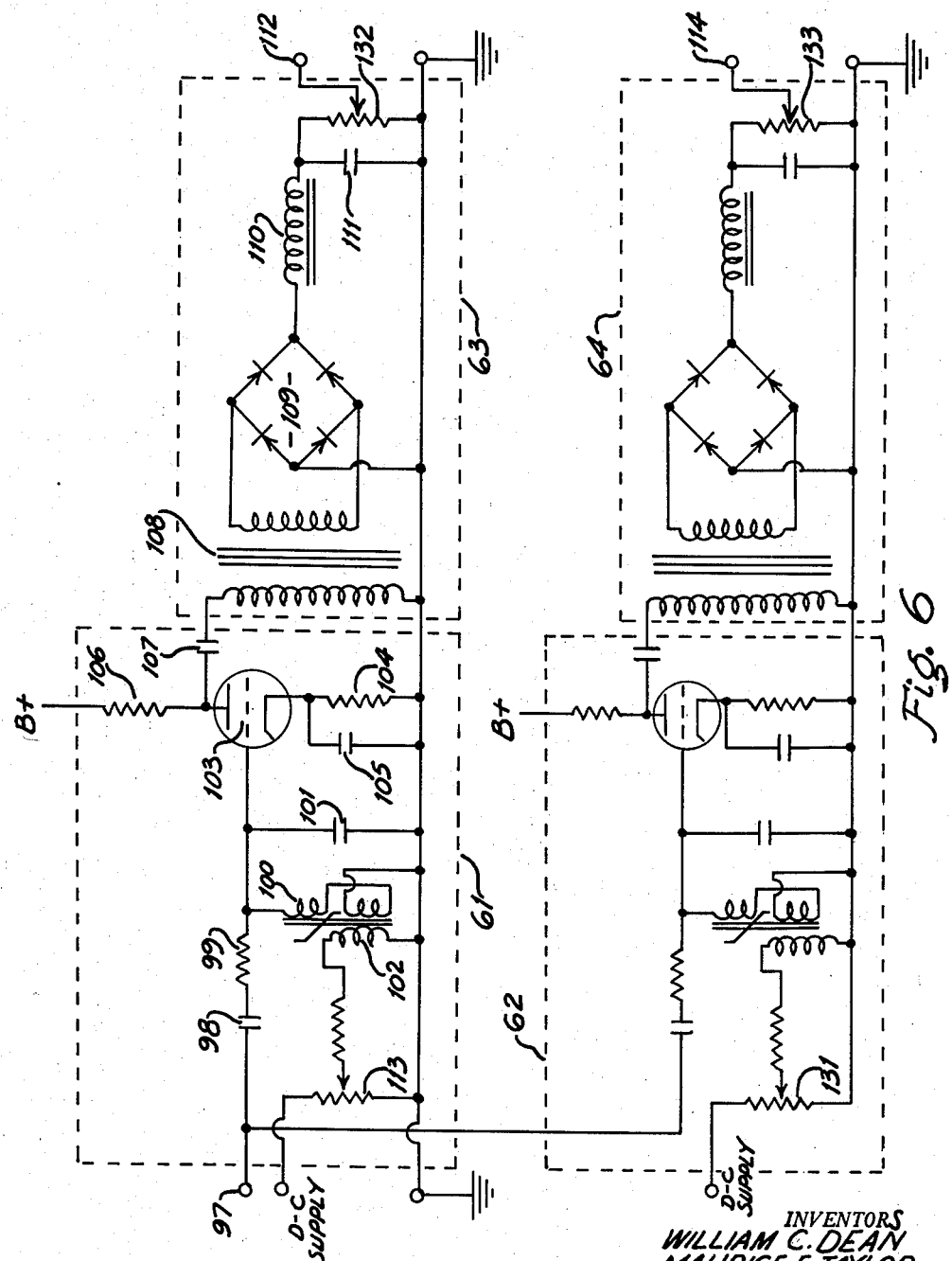
Figure 6 is a schematic wiring diagram of a pair of tuned amplifier-rectifier-filter channels employed in this invention.

The clipped signal from element 60 is transmitted in parallel to a pair of tuned band-pass filters 61 and 62 as seen in Figure 4. Figure 6 shows a schematic wiring diagram of the filters 61 and 62, and rectifiers 63 and 64 of Figure 4. The signal from the output terminal 97 (Figure 5) of the clipper 60 is applied in parallel to the filters shown in dotted outlines 61 and 62 in Figure 6. The outputs of filters 61 and 62 are respectively transmitted to full-wave rectifiers and low-pass filter units 63 and 64 also shown in the so-numbered dotted outlines of Figure 6. Inasmuch as the channel comprising elements 62 and 64 is identical (except for frequency of tuning) to the channel comprising elements 61 and 63, only the latter will be described in detail. The signal from terminal 97 is transmitted through blocking condenser 98 and series resistor 99 to a tank circuit comprising inductor 100 and condenser 101. Inductor 100 is of the saturable-core type having a control coil 102. Signal across the tank circuit is applied to the grid of tube 103 which has conventional cathode resistor 104 and bypass condenser 105. The plate of tube 103 has plate resistor 106 and coupling condenser 107, and the output signal is applied to the primary of a transformer 108. The secondary of transformer 108 is connected to a full-wave rectifier 109 whose negative terminal is grounded as shown, and whose positive terminal is connected to a low-pass filter comprising choke 110 and condenser 111. The resulting unidirectional output voltage may be adjusted by means of potentiometer 132 and the output delivered on terminal 112 will be a maximum when the frequency of the signal on terminal 97 corresponds to the frequency of tuning of the tank circuit comprising elements 100 and 101. This frequency is adjustable by controlling the current in the control coil 102 and for this purpose the control coil 102 is supplied with current from potentiometer 113 to which current may be supplied by the available B-supply circuit or any other suitable source of direct current. The potentiometer 113 may be calibrated in terms of frequency so that the filter 61 may be tuned to any desired known frequency. As previously indicated, the elements 62 and 64 of Figure 6 are identical to 61 and 63 expect that the filter 62 is tuned to a frequency $f_2$ that is below the lowest ringing frequency expected, whereas the filter 61 is tuned to a frequency $f_1$ that is above the highest ringing frequency expected. The output of the channel comprising elements 62 and 64 is delivered at terminal 114. The frequency adjustment of element 62 is made by adjusting potentiometer 131 and the gain of the channel is adjusted by means of potentiometer 133.

Figure 7 shows a graph of the steady-state unidirectional signal on terminals 112 and 114 respectively of Figure 6 when A.-C. of varying frequency is applied to terminal 97. Curve 112(a) shows the unidirectional voltage developed at terminal 112 by the channel comprising elements 61 and 63. It is seen that the curve 112(a) has a peak at the abscissa frequency $f_1$. The curve 114(a) shows the unidirectional signal developed on terminal 114 and this curve has a peak at the abscissa frequency $f_2$. Inasmuch as the channels comprising elements 61 and 63, and elements 62 and 64, respectively are identical, the peak ordinates of the curves 112(a) and 114(a) will be substantially the same and may be so adjusted by means of potentiometers 132 and 133. Also the curves 112(a) and 114(a) will be substantially symmetrical about their respective peak frequencies $f_1$ and $f_2$, so that the curves will cross at a point 120 whose frequency $f_0$ is substantially midway between the frequencies $f_1$ and $f_2$.

As seen in Figure 4, the unidirectional voltages developed at terminals 112 and 114 are respectively fed to the positive and the negative input terminals of unity-gain differential amplifier 65 which delivers a voltage that is the difference of the two voltages represented by the ordinates of curves 112(a) and 114(a). It is apparent that in the absence of input signal at the input terminal 12 the amplifier 65 will develop no voltage at its output lead 121 (Figure 4). Likewise if the ringing frequency should fall substantially midway between $f_1$ and $f_2$ (i.e. at the frequency $f_0$ which is the abscissa of point 120 of Figure 7) the amplifier 65 again will develop zero output. It is further apparent that if the ringing frequency deviates from $f_0$ a voltage will be developed on terminal 121 of Figure 4. The voltage on terminal 121 will be positive if the ringing frequency is higher than $f_0$ because the ordinate of curve 112(a) will be greater than the ordinate of 114(a), whereas if the ringing frequency is below the frequency $f_0$ the signal on terminal 121 will be negative because the ordinate of curve 112(a) is less than the ordinate of curve 114(a). Accordingly it is seen that the output of differential amplifier 65 will be a positive or negative voltage depending on whether the ringing frequency is above or below the frequency $f_0$.

In order to convert the signal appearing on terminal 121 to the required control signal on lead 18 (Figure 4) it is necessary to make certain adjustments, namely, a zero-control-signal adjustment that tunes the filter 11 at the average ringing frequency $f_0$ (Figure 7) when there is no signal on terminal 121, and a tracking-control adjustment whose function is to make the controlled variation of frequency of the filter 11 conform to the ringing frequency as seen by elements 61 and 62. Both of these adjustments are conveniently provided by employing an operational amplifier 66 (Figure 4) that is similar to the amplifiers 15 and 65. The signal from terminal 121 is connected to the negative input terminal of operational amplifier 66 through a potentiometer 139 connected as shown in Figure 4 for a reason to be explained more fully later. The positive input terminal of operational amplifier 66 is connected to the slider of a potentiometer 127 that is energized by battery 128. In parallel with potentiometer 127 is a pair of equal series resistors 129 whose midpoint is grounded as shown. The slider of potentiometer 127 may thus be adjusted to have a desired positive or negative voltage with respect to ground.

The potentiometer 139 is connected between junction 121 and the output terminal 122 of differential amplifier 66, and the slider of potentiometer 139 is connected to the negative input terminal of differential amplifier 66. This arrangement provides adjustable negative feedback around amplifier 66 and the potentiometer 139 serves as a means to adjust the gain provided by amplifier 66. It is apparent that by adjusting the position of the slider of potentiometer 139 the signal variation appearing on terminal 122 can be made to be exactly that required on lead 18 (i.e. terminal 130 of Figure 8) to make the controlled variation of frequency of the filter 11 track the variation in ringing frequency as seen by the filters 61 and 62. Simultaneous adjustment of the potentiometers 132 and 133 of Figure 6 also serves to adjust the tracking, and it has been found that by proper adjustment of all three potentiometers 132, 133, and 139 it is possible to attain a high degree of tracking precision. Also by properly adjusting potentiometer 127 the frequency control signal delivered at the output terminal 122 of amplifier 66 can be made such that when applied to the terminal 130 of Figure 8 in the absence of any signal input to terminal 12, the band-pass filter 11 will have its transmission peak ($f_r$ (Figure 2(b))) exactly at the frequency $f_0$ corresponding to the abscissa of point 120 of Figure 7. The lead 18 (Figure 4) carries the control signal from the output terminal 122 of amplifier 66 (Figure 4) to the terminal 130 of control coil 55 (Figure 8) of the filter 11 (Figures 4 and 8). It is apparent that the channel starting with element 60 and finishing with lead 18 serves as a frequency-sensitive control circuit as indicated by element 17 of Figure 3.

Certain other adjustments previously mentioned are necessary or desirable. The band-pass filter 11 is adjusted so that its peak amplification 14 of Figure 2(a) is the same as the amplification 13 of the broad-band amplifier 10. This provides that the notch 19 of Figure 2(a) will meet the zero axis as previously explained. The frequency of filter 61 is adjusted by means of potentiometer 113 so that its frequency ($f_1$) is above the highest frequency expected. The frequency of filter 62 is adjusted by means of potentiometer 131 to a frequency ($f_2$) that is below the lowest ringing frequency expected. Potentiometers 113 and 131 may be calibrated so that these adjustments will be known. The output of the two channels comprising elements 61 and 63 and elements 62 and 64, respectively, are adjusted to have substantially equal amplification by adjustment of potentiometers 132 and 133 respectively. As previously indicated the potentiometer 127 (Figure 4) is set so that in the absence of input signal at input terminal 12, the transmission peak of resonant filter 11 is at an intermediate frequency $f_0$ lying between the highest and the lowest ringing frequency expected. The tracking adjustment is made by means of potentiometer 139 (and also 132 and 133 of Figure 6) as previously described. The band width of the filter 11 is adjusted by means of the tap switch 45 (Figure 8) and also variable resistor 142. By running a few typical seismograms the band width of filter 11 that results in best operation for any particular survey area can readily be determined. The overall gain of the entire system is controlled by means of a conventional gain control (not shown) preferably connected to the output terminal 135.

In the schematic wiring diagrams of Figures 5, 6, and 8, the heater circuits for the vacuum tubes are conventional and are not shown in the diagrams in the interest of simplification. Connection to the B-supply voltage are indicated by the symbol B+ in conventional manner. A B-supply voltage of 280 volts may be employed.

In the frequency control channel the time constants of the low pass filter employed in units 63 and 64 have the same value and this is made sufficiently low so that the system will adequately respond to changes in ringing frequency. Ordinarily, however, the ringing frequency does not change very rapidly and it has been found that a time constant in the range 0.1 to 0.5 second is satisfactory.

By way of example only, and not by way of limitation, the various elements forming components of the circuits of this invention may have values given in the following table:

| Element No. | Component | Specification |
|---|---|---|
| 15 | Operational amplifier | Philbrick K2-W. |
| 20 | Vacuum tube | Type 12AU7. |
| 21 | Condenser | 1 mfd. |
| 22 | Resistor | 1 megohm. |
| 23 | do | 56,000 ohms. |
| 24 | do | 3,900 ohms. |
| 25 | Condenser | 1 mfd. |
| 26 | do | 25 mfd. |
| 28 | Vacuum tube | Type 12AX7. |
| 29 | Resistor | 1 megohm. |
| 30 | Condenser | 1 mfd. |
| 31 | Resistor | 1,800 ohms. |
| 32 | Condenser | 25 mfd. |
| 33 | Resistor | 100,000 ohms. |
| 34 | Condenser | 2 mfd. |
| 35 | Resistor | 10,000 ohms. |
| 36 | Potentiometer | 100,000 ohms. |
| 37 | Condenser | 1 mfd. |
| 38 | Resistor | 1.8 megohm. |
| 39 | Saturable-core reactor | Magnetics, Inc., maximum adjustable inductance, 1,000 henrys. |
| 40 | Condenser | Approx. 0.2 mfd. |
| 41 | do | Do. |
| 43 | Vacuum tube | Type 6AU6. |
| 45 | Switch | 3 Position. |
| 47 | Resistor | 2,400 ohms. |
| 48 | do | 62,000 ohms. |
| 49 | do | 470,000 ohms. |
| 50 | do | 200,000 ohms. |
| 51 | Condenser | 0.5 mfd. |
| 52 | do | 1 mfd. |
| 53 | Resistor | 10,000 ohms. |
| 54 | Condenser | 2 mfd. |
| 56 | do | 1 mfd. |
| 65 | Operational amplifier | Philbrick K2-W. |
| 66 | do | Do. |
| 70 | Condenser | 1 mfd. |
| 71 | Resistor | 1 megohm. |
| 72 | Zener diode | Texas Instruments, Inc., 650Co. |
| 74 | Vacuum tube | Type 6AU6. |
| 75 | Resistor | 1,800 ohms. |
| 76 | Condenser | 25 mfd. |
| 77 | Resistor | 120,000 ohms. |
| 78 | do | 200,000 ohms. |
| 79 | Condenser | 0.25 mfd. |
| 80 | do | 1 mfd. |
| 81 | Resistor | 1 megohm. |
| 82 | Zener diode | Texas Instruments, Inc., 650Co. |
| 84 | Condenser | 1 mfd. |
| 85 | Resistor | 1 megohm. |
| 86 | Vacuum tube | Type 6AU6. |
| 87 | Condenser | 1 mfd. |
| 88 | Resistor | 1 megohm. |
| 89 | Zener diode | Texas Instruments, Inc., 650Co. |
| 91 | Condenser | 1 mfd. |
| 92 | Vacuum tube | Type 6AU6. |
| 93 | Condenser | 1 mfd. |
| 94 | Resistor | 1 megohm. |
| 95 | Zener diode | Texas Instruments, Inc., 650Co. |
| 96 | Condenser | 1 mfd. |
| 98 | do | Do. |
| 99 | Resistor | 200,000 ohms. |
| 100 | Saturable-core reactor | Magnetics, Inc., maximum adjustable inductance, 1,000 henrys. |
| 101 | Condenser | 0.1 mfd. |
| 103 | Vacuum tube | 12AX7. |
| 104 | Resistor | 1,800 ohms. |
| 105 | Condenser | 25 mfd. |
| 106 | Resistor | 100,000 ohms. |
| 107 | Condenser | 1 mfd. |
| 108 | Transformer | Southwestern Industrial Electronics Co., type RA-1767. |
| 109 | Full-wave rectifier | Hughes type 1N100. |
| 110 | Choke | Southwestern Industrial Eletronics Co., type GFC-1,000. |
| 111 | Condenser | 2.5 mfd. |
| 113 | Potentiometer | 100,000 ohms. |
| 127 | do | Do. |
| 128 | Battery | 6 volts. |
| 129 | Resistor | 100,000 ohms each. |
| 131 | Potentiometer | 100,000 ohms. |
| 132 | do | Do. |
| 133 | do | Do. |
| 139 | do | 1 megohm. |
| 140 | Resistor | 100,000 ohms. |
| 141 | do | Do. |
| 142 | Variable resistor | Do. |

When the seismic signal is impressed on terminal 12, the effect of the channels 10 and 11 and unity-gain differential amplifier 15 is to attenuate the frequency $f_r$ to which the band-pass filter 11 is automatically adjusted by means of the frequency-sensitive control channel, the latter comprising clipper 60, the two tuned filters 61 and 62 each with its rectifier-filters 63 and 64, unity-gain differential amplifier 65, and operational amplifier 66. The frequency-sensitive control channel develops a signal in lead 18 which effects adjustment of the band-pass filter 11 to the frequency of ringing found in the input seismic signal. Accordingly the system attenuates the ringing signal at whatever frequency it may occur, with respect to the useful seismic signal.

Figure 9 shows an example of a typical seismogram that has been transmitted through the filter of this invention. The conventional timing lines have been omitted, also the first-arrival part of the record is omitted because it is of no interest and only that part of the seismogram that may carry reflected seismic events is of interest. It is seen that the ringing effect is materially reduced so that the useful seismic reflection impulse signals 140 are clearly discernible and can be timed with accuracy. Figure 9 shows the result of transmitting the seismogram of Figure 1 through the apparatus of this invention and in which the width of the notch 19 at half amplitude was about 2 c.p.s. Figure 9 illustrates how this invention improves the character of a ringing seismogram.

It is apparent that the system of this invention may be employed either during the original recording of a seismogram in the field or for rerecording in a central processing office. In the event that the system is used in the field, the apparatus of this invention is connected between any two stages in the seismic field amplifier which amplifier may include additional conventional filtering, automatic gain-control features, etc. In the event that the invention is employed in a central processing facility, the apparatus of this invention is connected between any two stages in a playback or recording amplifier.

Whereas this invention has been described as applied to the elimination of ringing from geophysical seismograms, it is apparent that the apparatus of this invention is applicable to any electrical filtering problem in which it is required to remove an undesired relatively sustained sinusoidal signal from a composite electrical signal that contains useful impulse signals. The apparatus of this invention removes the undesired disturbing signal leaving the desired impulses more easily recognizable so that appropriate analysis of the useful signals can be made.

What we claim as our invention is:

1. Apparatus for filtering a sustained sinusoidal signal from a composite electrical signal which comprises a first signal channel having a broad pass band, a second signal channel including a band-pass filter the frequency of whose pass band is controllable and having a peak amplification substantially the same as the amplification of said first channel, said second channel having a control terminal and a peak transmission frequency determined by the magnitude of a unidirectional signal applied to said control terminal, a differential amplifier, means transmitting the output signals of said first and second channels to the respective input terminals of said differential amplifier, a frequency-sensitive control circuit delivering a unidirectional output signal whose magnitude varies with the frequency of signal applied to the input terminals of said frequency-sensitive control circuit, means transmitting the signal to be filtered to said first channel and to said second channel and to said frequency-sensitive control circuit in parallel, means transmitting the output signal of said frequency-sensitive control circuit to the control terminal of said second channel, whereby filtered signal is delivered at the output of said differential amplifier.

2. Apparatus for filtering a sustained sinusoidal signal from a composite electrical signal which comprises a first signal channel having a broad pass band, a second signal channel having a high-Q resonance at a controllable frequency and having a peak amplification substantially the same as the amplification of said first channel, said second channel having a control terminal and a peak transmission frequency determined by the magnitude of a unidirectional signal applied to said control terminal, a differential amplifier, means transmitting the output signals of said first and second channels to the respective input terminals of said differential amplifier, a frequency-sensitive control circuit delivering a unidirectional output signal whose magnitude varies with the frequency of signal applied to the input terminals of said frequency-sensitive control circuit, means transmitting the signal to be filtered to said first channel and to said second channel and to said frequency-sensitive control circuit in parallel, means transmitting the output signal of said frequency-sensitive control circuit to the control terminal of said second channel, whereby filtered signal is delivered at the output of said differential amplifier.

3. Apparatus for filtering a sustained sinusoidal signal from a composite electrical signal which comprises a first channel having a broad pass band, a second signal channel including a band-pass filter the frequency of whose pass band is controllable and having a peak amplification substantially the same as the amplification of said first channel, said second channel including a saturable-core reactor in a circuit whereby the peak transmission frequency of said second channel is determined by the magnitude of a unidirectional signal applied to the control winding of said saturable-core reactor, a differential amplifier, means transmitting the output signals of said first and second channels to the respective input terminals of said differential amplifier, a frequency-sensitive control circuit delivering a unidirectional output signal whose magnitude varies with the frequency of signal applied to the input terminals of said frequency-sensitive control circuit, means transmitting the signal to be filtered to said first channel and to said second channel and to said frequency-sensitive control circuit in parallel, means transmitting the output signal of said frequency-sensitive control circuit to the control winding of said saturable-core reactor in said second channel, whereby filtered signal is delivered at the output of said differential amplifier.

4. Apparatus for filtering a sustained sinusoidal signal from a composite electrical signal which comprises a first signal channel having a pass band of width sufficient to transmit the composite electrical signal, a second signal channel including a band-pass filter the frequency of whose pass band is controllable and having a peak amplification over the controllable range of frequencies substantially the same as the amplification of said first channel, said second channel having a tank circuit including a saturable-core reactor with a control winding whereby the frequency of peak amplification of said second channel is controlled by the magnitude of signal in said control winding, a differential amplifier, means transmitting the output signals of said first and second channels to the respective input terminals of said differential amplifier, a frequency-sensitive control circuit delivering a control signal that increases with increase in frequency of signal applied to the input terminals of said frequency-sensitive control circuit, means transmitting the signal to be filtered to said first channel and to said second channel and to said frequency-sensitive control circuit in parallel, means transmitting control signal from the output terminal of said frequency-sensitive control circuit to the control terminal of said second channel, whereby filtered signal is delivered at the output of said differential amplifier.

5. Apparatus for filtering an undesired sustained sinusoidal signal from a composite electrical signal which comprises a first signal channel having a pass band of width sufficient to transmit the composite electrical signal, a second signal channel including a band-pass filter the frequency of whose pass band is controllable and having a peak amplification substantially the same as the amplification of said first channel, said second channel having a control terminal and a peak transmission frequency that increases with the magnitude of a unidirectional signal applied to said control terminal, a first differential amplifier, means transmitting the output signals of said first and second channels to the respective input terminals of said first differential amplifier, a signal clipper, a third band-pass filter tuned to a frequency at least as low as the lowest undesired frequency to be expected, a fourth band-pass filter tuned to a frequency at least as high as the highest undesired frequency to be expected, two full-wave rectifiers, means transmitting signal from said clipper to said third and fourth filters in parallel, means transmitting signal from said third filter to one of said rectifiers, means transmitting signal from said fourth filter to the other of said rectifiers, a second differential amplifier, means transmitting the output signals of said rectifiers to the respective input terminals of said second differential amplifier, means transmitting the output signal of said second differential amplifier to the control terminal of said second channel, said last-named means including means for adjusting the peak transmission frequency of said second channel in the absence of input signal to a value intermediate the highest undesired frequency to be expected and the lowest undesired frequency to be expected, and means transmitting the signal to be filtered to said first channel and to said second channel and to said clipper in parallel, whereby filtered signal is delivered at the output of said first differential amplifier.

6. Apparatus for filtering an undesired sustained sinusoidal signal from a composite electrical signal which comprises a first signal channel having a pass band of width sufficient to transmit the composite electrical signal, a second signal channel including a band-pass filter the frequency of whose pass band is controllable and having a peak amplification substantially the same as the amplification of said first channel, said second channel having a control terminal and a peak transmission frequency that increases with the magnitude of a unidirectional signal applied to said control terminal, a first differential amplifier, means transmitting the output signals of said first and second channels to the respective input terminals of said first differential amplifier, a signal clipper, a third band-pass filter tuned to a frequency at least as low as the lowest undesired frequency to be expected, a fourth band-pass filter tuned to a frequency at least as high as the highest undesired frequency to be expected, two full-wave rectifiers, means transmitting signal from said clipper to said third and fourth filters in parallel, means transmitting signal from said third filter to one of said rectifiers, means transmitting signal from said fourth filter to the other of said rectifiers, a second differential amplifier, means transmitting the output signals of said rectifiers to the respective input terminals of said second differential amplifier, a third differential amplifier, means transmitting the output signal of said second differential amplifier to one of the input terminals of said third differential amplifier, means for adjusting the gain of said third differential amplifier connected thereto, a source of unidirectional voltage adjustable as to magnitude and polarity connected to the other input terminal of said third differential amplifier, means transmitting the output signal of said third differential amplifier to the control terminal of said second channel, and means transmitting the signal to be filtered to said first channel and to said second channel and to said clipper in parallel, whereby filtered signal is delivered at the output of said first differential amplifier.

7. Apparatus for filtering ringing signal from a composite seismic signal which comprises a first signal channel having a pass band of width sufficient to transmit the composite seismic signal, a second signal channel including a band-pass filter the frequency of whose pass band is controllable and having a peak amplification over the controllable range of frequencies substantially the same as the amplification of said first channel, said second channel having a tank circuit including a saturable-core reactor with a control winding whereby the frequency of peak amplification of said second channel increases with increase in current in said control winding, a differential amplifier, means transmitting the output signals of said first and second channels to the respective input terminals of said differential amplifier, a frequency-sensitive control circuit delivering a unidirectional output current that increases with increase in frequency of signal applied to the input terminals of said frequency-sensitive control circuit, means transmitting the signal to be filtered to said first channel and to said second channel and to said frequency-sensitive control circuit in parallel, means transmitting output current from said frequency-sensitive control circuit to the control terminal of said second channel, whereby filtered seismic signal is delivered at the output of said differential amplifier.

8. Apparatus for filtering ringing signal from a composite seismic signal which comprises a first signal channel having a pass band of width sufficient to transmit the composite seismic signal, a second signal channel including a band-pass filter the frequency of whose pass band is controllable and having a peak amplification substantially the same as the amplification of said first channel, said second channel having a control terminal and a peak transmission frequency that increases with the magnitude of a unidirectional signal applied to said control terminal, a first differential amplifier, means transmitting the output signals of said first and second channels to the respective input terminals of said first differential amplifier, a signal clipper, a third band-pass filter tuned to a frequency below the lowest ringing frequency to be expected, a fourth band-pass filter tuned to a frequency above the highest ring frequency to be expected, two full-wave rectifiers, means transmitting signal from said clipper to said third and fourth filters in parallel, means transmitting signal from said third filter to one of said rectifiers, means transmitting signal from said fourth filter to the other of said rectifiers, a second differential amplifier, means transmitting the output signals of said rectifiers to the respective input terminals of said second differential amplifier, means transmitting the output signal of said second differential amplifier to the control terminal of said second channel, and means transmitting the signal to be filtered to said first channel and to said second channel and to said clipper in parallel, whereby filtered seismic signal is delivered at the output of said first differential amplifier.

9. Apparatus for filtering ringing signal from a composite seismic signal which comprises a first signal channel having a pass band of width sufficient to transmit the composite seismic signal, a second signal channel including a band-pass filter the frequency of whose pass band is controllable and having a peak amplification substantially the same as the amplification of said first channel, said second channel having a control terminal and a peak transmission frequency that increases with the magnitude of a unidirectional signal applied to said control terminal, a first differential amplifier, means transmitting the output signals of said first and second channels to the respective input terminals of said first differential amplifier, a signal clipper, a third band-pass filter tuned to a frequency below the lowest ringing frequency to be expected, a fourth band-pass filter tuned to a frequency above the highest ringing frequency to be expected, two full-wave rectifiers, means transmitting signal from said clipper to said third and fourth filters in parallel, means transmitting signal from said third filter to one of said rectifiers, means transmitting signal from said fourth filter to the other of said rectifiers, a second differential amplifier, means transmitting the output signals of said rectifiers to the respective input terminals of said second differential amplifiers, means transmitting the output signal of said second differential amplifier to the control terminal of said second channel, said last-named means including means for adjusting the peak transmission frequency of said second channel in the absence of input signal to a value intermediate the highest ringing frequency to be expected and the lowest ringing frequency to be expected, and means transmitting the signal to be filtered to said first channel and to said second channel and to said clipper in parallel, whereby filtered seismic signal is delivered at the output of said first differential amplifier.

No references cited.